United States Patent
Sehgal et al.

(10) Patent No.: US 12,423,355 B2
(45) Date of Patent: Sep. 23, 2025

(54) ACCESSING MULTIPLE DOMAINS ACROSS MULTIPLE DEVICES FOR CANDIDATE RESPONSES

(71) Applicant: Apple Inc., Cupertino, CA (US)

(72) Inventors: Vivek Sehgal, Santa Clara, CA (US); Lun Cui, Los Altos, CA (US); Gennaro Frazzingaro, San Francisco, CA (US); Ian M. Priestley, Palo Alto, CA (US); Nicolas Zeitlin, Berkeley, CA (US); Sumit Wattal, Santa Clara, CA (US); Luca Lupo, San Jose, CA (US); Harsh Fatepuria, San Jose, CA (US); Nilesh Karia, Dublin, CA (US); Pulah Shah, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 371 days.

(21) Appl. No.: 16/145,076

(22) Filed: Sep. 27, 2018

(65) Prior Publication Data
US 2019/0370413 A1    Dec. 5, 2019

Related U.S. Application Data

(60) Provisional application No. 62/679,891, filed on Jun. 3, 2018.

(51) Int. Cl.
*G06F 16/9032* (2019.01)
*G06F 16/9535* (2019.01)
*G10L 15/22* (2006.01)

(52) U.S. Cl.
CPC .... *G06F 16/90332* (2019.01); *G06F 16/9535* (2019.01); *G10L 15/22* (2013.01); *G10L 2015/225* (2013.01)

(58) Field of Classification Search
CPC ........... G06F 16/90332; G06F 16/9535; G06F 16/90335; G10L 15/22; G10L 2015/225; G10L 2015/22; G06N 5/00
(Continued)

(56) References Cited

U.S. PATENT DOCUMENTS 9,213,771 B2    12/2015 Chen et al.
9,275,115 B2    3/2016 Haggar et al.
(Continued)

OTHER PUBLICATIONS

Akritidis, Leonidas & Katsaros, Dimitrios & Bozanis, Panayiotis "Effective rank aggregation for metasearching" The Journal of Systems and Software 84: 130-143 (2011).*
(Continued)

*Primary Examiner* — Syed H Hasan
(74) *Attorney, Agent, or Firm* — BAKERHOSTETLER

(57) ABSTRACT

A device implementing a system for determining an answer to a question includes a processor configured to receive a question from a client device, and send the question to a first information domain comprising plural search subdomains, each of the plural search subdomains being configured to provide a respective candidate answer to the question in a format that differs from those provided by the other search subdomains of the plural search subdomains. The processor is further configured to receive, in response to sending the question, the candidate answer from each of the plural search subdomains, and provide at least one of the candidate answers to the client device, for providing an answer to the question based on the at least one of the candidate answers.

20 Claims, 7 Drawing Sheets

(58) Field of Classification Search
USPC .......................................................... 707/769
See application file for complete search history.

(56) References Cited

U.S. PATENT DOCUMENTS

| | | | |
|---|---|---|---|
| 9,430,573 B2 | 8/2016 | Bailey et al. | |
| 2010/0223261 A1* | 9/2010 | Sarkar | G06Q 30/02 |
| | | | 707/726 |
| 2011/0125734 A1 | 5/2011 | Duboue | |
| 2012/0078636 A1* | 3/2012 | Ferrucci | G06F 16/24564 |
| | | | 704/270.1 |
| 2012/0296638 A1* | 11/2012 | Patwa | G06F 16/367 |
| | | | 704/E15.001 |
| 2015/0026163 A1* | 1/2015 | Haggar | G06F 16/24578 |
| | | | 707/723 |
| 2016/0092699 A1* | 3/2016 | Riva | H04L 63/0421 |
| | | | 726/26 |
| 2017/0177386 A1* | 6/2017 | Fung | G06F 16/3329 |
| 2017/0308531 A1* | 10/2017 | Ma | G06N 5/022 |
| 2017/0357650 A1* | 12/2017 | de Almeida Forjaz de Lacerda .. | |
| | | | G06F 16/951 |

OTHER PUBLICATIONS

Renda, M.E., Straccia, U., "Web metasearch: rank vs score-based rank aggregation methods" *Proceedings of the ACM International Symposium on Applied Computing (SAC)*, pp. 841-846 (2003).*
International Search Report and Written Opinion from PCT/US2019/023450, dated Aug. 14, 2019, 10 pages.

* cited by examiner

ACCESSING MULTIPLE DOMAINS ACROSS MULTIPLE DEVICES FOR CANDIDATE RESPONSES

CROSS-REFERENCE TO RELATED APPLICATIONS

The present application claims the benefit of U.S. Provisional Patent Application Ser. No. 62/679,891, entitled "Accessing Multiple Domains Across Multiple Devices For Candidate Responses," filed on Jun. 3, 2018, which is hereby incorporated by reference in its entirety for all purposes.

TECHNICAL FIELD

The present description relates generally to providing a response to a question, including accessing multiple information domains to obtain candidate responses to a question.

BACKGROUND

An application such as a virtual assistant allows users to ask questions and receive answers to their questions. For example, a user may verbally ask a question to a virtual assistant, and the virtual assistant may provide a response to the question that includes audio content and/or visual content.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
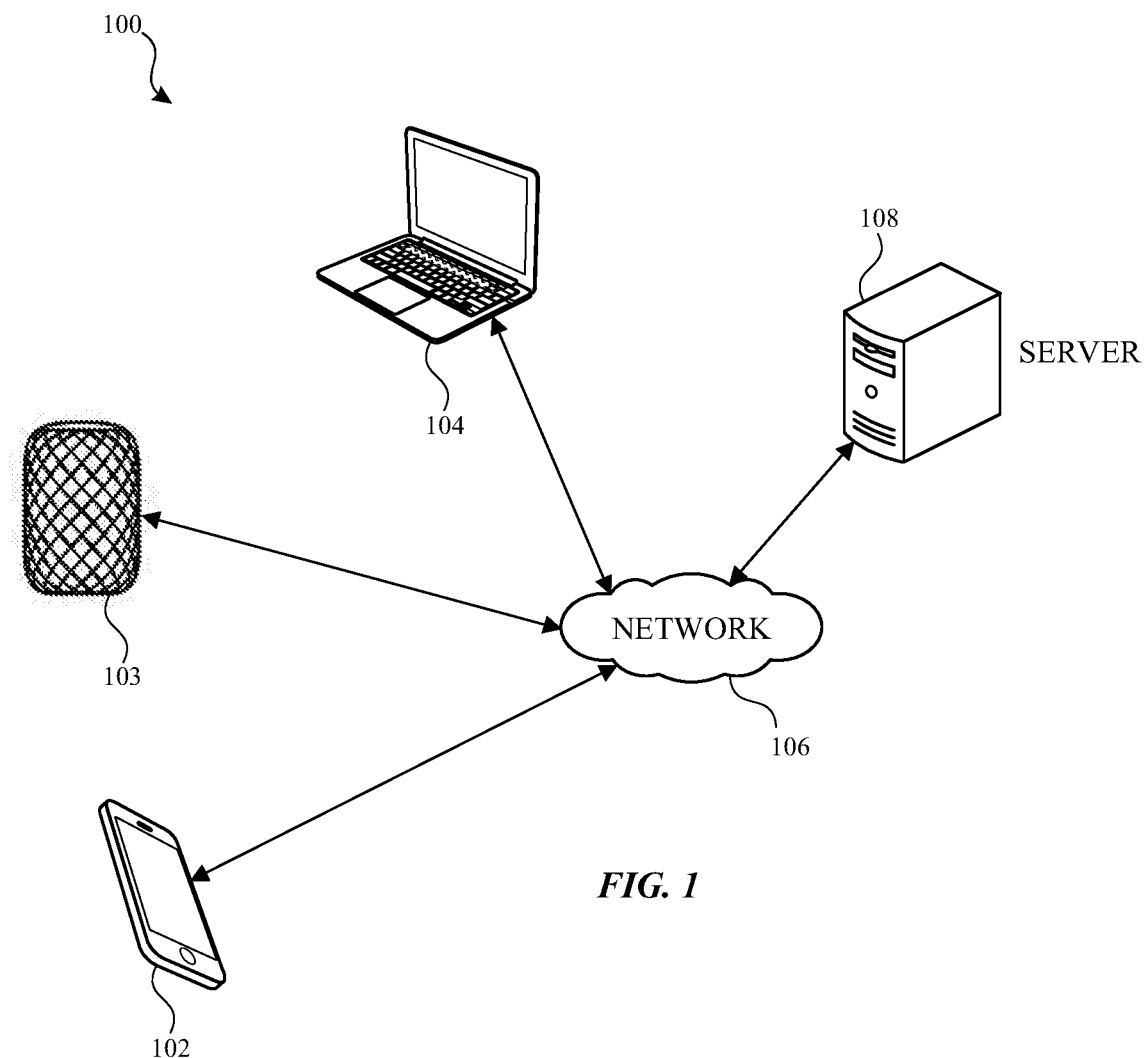
FIG. 1 illustrates an example network environment for determining an answer to a question in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Applications such as virtual assistants may provide the ability to provide an answer to a question (e.g., a verbal question). There are a variety of types of questions that a user may ask the application. Based on the type of question, the user may prefer an answer in a particular format. For example, in response to the question such as "how do I replace a tire?," the user may wish to receive a procedural answer with step-by-step instructions for replacing a tire. In response to another example question, "where is the first ABC Coffee shop?," the user may wish to receive a passage-based answer, in which the answer is in form of a passage that addresses the question. In response to another example question, "can you play movie XYZ?," the user may wish to be directed to a media source such as a video or music source.

The subject system provides for providing an answer to a user question, by sending a question to multiple information domains, each of which is configured to provide a candidate answer, such as in a different format. The subject system further allows the information domains to provide confidence scores for their candidate answers, which may be used to select the answer (e.g., a most appropriate answer) to the question.

In one or more implementations, context data (e.g., server-based and/or client-based) may be used in order to select the answer. For example, the server-based context data may include one or more broad topics associated with the user, such topics that broadly correlate to the user's interests, e.g., without identifying the user. Alternatively or in addition, client-based context data may be based on data that is locally stored on the device (e.g., and not provided to the server), such as context related to contacts, messages, and/or activity data associated with device applications. The answer to the question may be selected based on a server-based ranking of the candidate answers (e.g., based on the confidence scores and/or the server-based context data) in conjunction with a client-based ranking of the candidate answers (e.g., based on the server-based ranking, the confidence scores, and/or the client-based context data).

By virtue of using multiple information domains which are configured to search for different types of answers and/or provide answers in different formats, and by ranking candidate answers based on server and/or client-based context information, the subject system can provide an answer to a question, for example, that is in a format that is most useful to the user. In addition, since the client-based context data is local to the device (e.g., and when appropriate, shared with the server while preserving privacy), the privacy of user data may be maintained while also providing the user with an answer (e.g., a most appropriate answer) to the question.

FIG. 1 illustrates an example network environment 100 for determining an answer to a question in accordance with one or more implementations. Not all of the depicted components may be used in all implementations, however, one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102, 103 and 104 (hereinafter 102-104), a network 106 and a server 108. The network 106 may communicatively (directly or indirectly) couple, for example, any two or more of the electronic devices 102-104 and the server 108. In one or more implementations, the network 106 may be an interconnected network of devices that may include, and/or may be communicatively coupled to, the Internet. For explanatory purposes, the network environment 100 is illustrated in FIG. 1 as including electronic devices 102-104 and a single server 108; however, the network environment 100 may include any number of electronic devices and any number of servers.

One or more of the electronic devices 102-104 may be, for example, a portable computing device such as a laptop computer, a smartphone, a smart speaker, a peripheral device (e.g., a digital camera, headphones), a tablet device, a wearable device such as a watch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 102 is depicted as a smartphone, the electronic device 103 is depicted as a smart speaker and the electronic device 104 is depicted as a laptop computer. In response to a question received by a user at any of the electronic devices 102-104, the respective electronic device may provide an answer to the question. Moreover, the electronic devices 102-104 may communicate with each other in a peer-to-peer manner (e.g., via one of more of the above-noted communication interfaces), for example, to facilitate in providing an answer to a user question provided by a user at any one of the electronic devices 102-104. Each of the electronic devices 102-104 may be, and/or may include all or part of, the device discussed below with respect to FIG. 2, and/or the electronic system discussed below with respect to FIG. 7.

The server 108 may be, and/or may include all or part of the device discussed below with respect to FIG. 2, and/or the electronic system discussed below with respect to FIG. 7. The server 108 may include one or more servers, such as a cloud of servers, that may be used to facilitate providing an answer to a question provided by a user at any of the electronic devices 102-104. For explanatory purposes, a single server 108 is shown and discussed with respect to various operations, such as facilitating in providing an answer to a user question. However, these and other operations discussed herein may be performed by one or more servers, and each different operation may be performed by the same or different servers.

Figure 2:
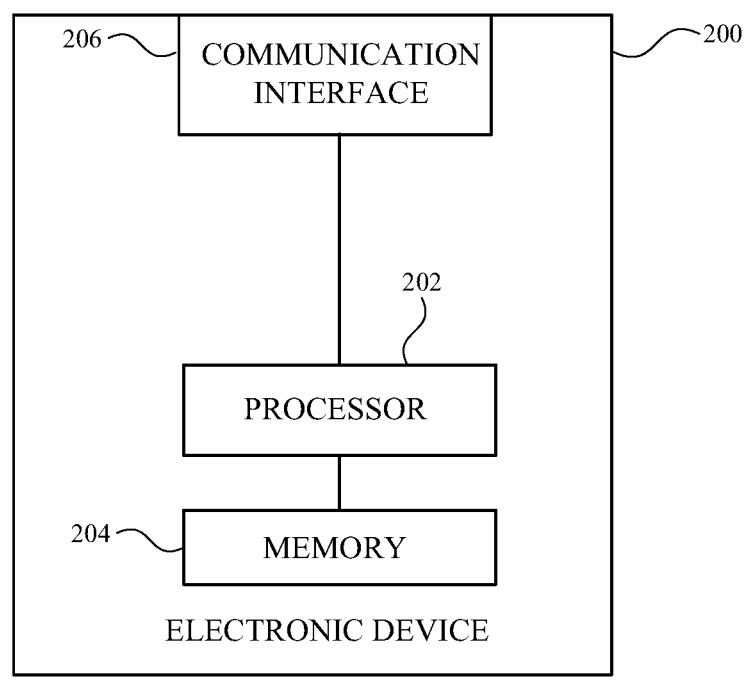
FIG. 2 illustrates an example device that may implement all or part a system for determining an answer to a question in accordance with one or more implementations.

FIG. 2 illustrates an example device that may implement all or part of a system for determining an answer to a question in accordance with one or more implementations. For example, the device 200 of FIG. 2 can correspond to any of the electronic devices 102-104, or to the server 108 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The device 200 may include a processor 202, a memory 204, and a communication interface 206. The processor 202 may include suitable logic, circuitry, and/or code that enable processing data and/or controlling operations of the device 200. In this regard, the processor 202 may be enabled to provide control signals to various other components of the device 200. The processor 202 may also control transfers of data between various portions of the device 200. Additionally, the processor 202 may enable implementation of an operating system or otherwise execute code to manage operations of the device 200. In the subject system, the processor 202 may implement architecture for determining an answer to a question as discussed further below with respect to FIGS. 3 and 4.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, in a case where the device 200 corresponds to one of the electronic devices 102-104, the memory 204 may store an application (e.g., a virtual assistant) which is configured to provide answers to questions input by a user (e.g., verbal input). In one or more implementations, the application (e.g., virtual assistant) may be part of the operating system of the electronic devices 102-104.

In one or more implementations, in a case where the device 200 corresponds to the server 108, the memory 204 may store one or more components configured to work in conjunction with the above-mentioned device application (e.g., the virtual assistant), to facilitate in providing an answer to a user question.

The communication interface 206 may include suitable logic, circuitry, and/or code that enables wired or wireless communication, such as between any of the electronic devices 102-104 and the server 108 over the network 106. The communication interface 206 may include, for example, one or more of a Bluetooth communication interface, a cellular interface, an NFC interface, a Zigbee communication interface, a WLAN communication interface, a USB communication interface, or generally any communication interface.

In one or more implementations, one or more of the processor 202, the memory 204, the communication interface 206, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
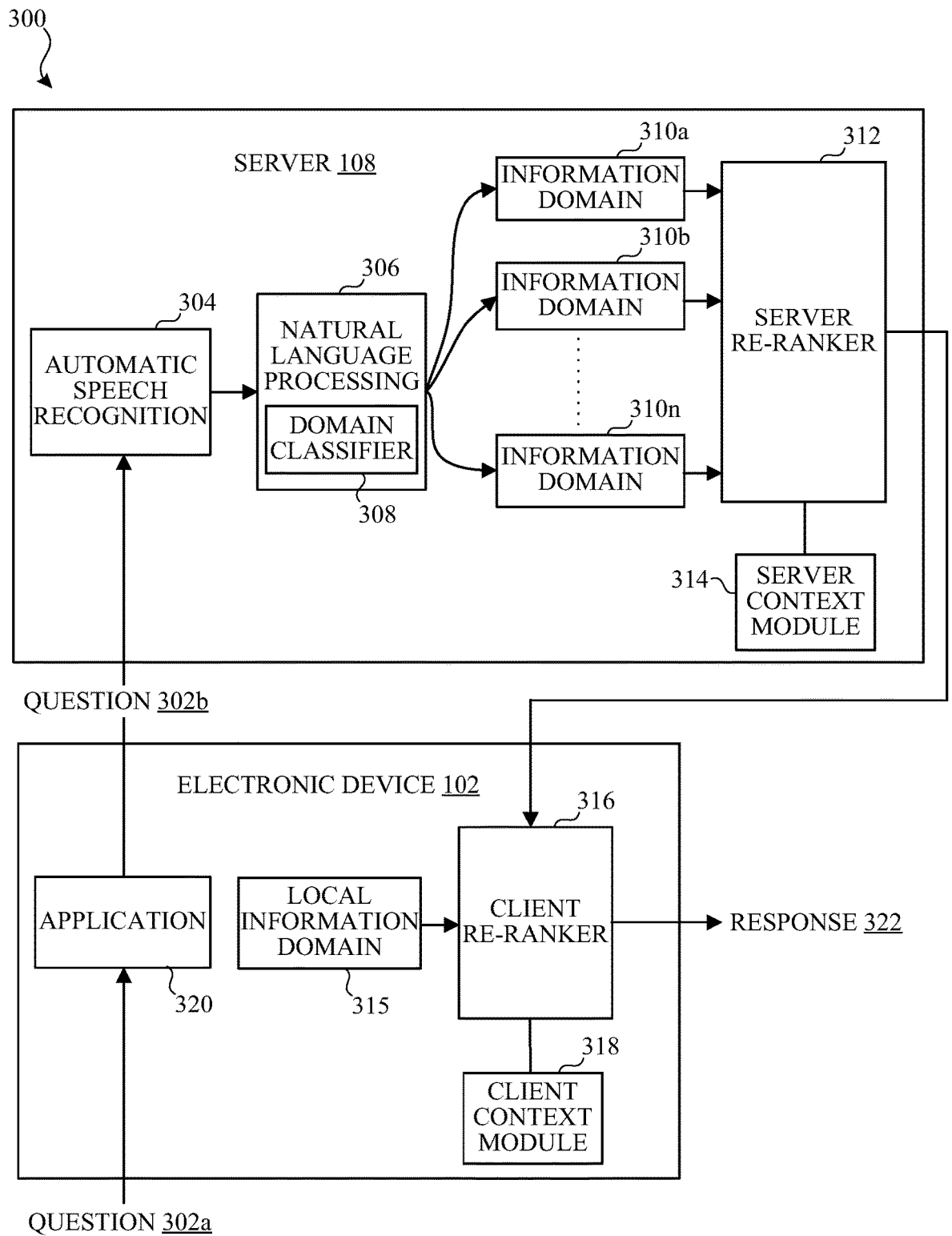
FIG. 3 illustrates an example system for determining an answer to a question in accordance with one or more implementations.

FIG. 3 illustrates an example system 300 for determining an answer to a question in accordance with one or more implementations. For example, the system 300 can be implemented by one or more software modules running on the respective processors 202 of the server 108 and/or the electronic device 102. While FIG. 3 refers to the electronic device 102, any of the electronic devices 103-104 may be used instead. In one or more implementations, the system 300 can be implemented by one or more software modules and/or by custom hardware (e.g., one or more coprocessors, ASICs, etc.). Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As shown in FIG. 3, the system 300 includes server-based components corresponding to the server 108, and device-based components corresponding to the electronic device 102. More specifically, the server 108 may include an automatic speech recognition component 304 (hereinafter the "ASR 304"), a natural language processing component (hereinafter the "NLP 306"), a domain classifier 308, information domains 310a-310n, and a server re-ranker 312 which is configured to access a server context module 314. The electronic device 102 includes an application 320 (e.g., a virtual assistant), a local information domain 315, and a client re-ranker 316 which is configured to access a client context module 318.

As shown in FIG. 3, the application 320 (e.g., virtual assistant) running on the electronic device 102 may receive a question 302a (e.g., a question spoken by a user). The application 320 may provide a representation of the spoken query, depicted as the question 302b, to the server 108 (e.g., via the network 106). The server 108 is configured to generate candidate answer(s) to the received question 302b. The candidate answer(s) may be provided to the electronic device 102, in order to provide a response 322 to the spoken question (e.g., the question 302a).

The ASR 304 is configured to provide for the recognition and translation of spoken language into text. For example, the ASR 304 may receive the question 302b from the electronic device 102. The ASR 304 converts the received question 302b to one or more text interpretations of the spoken question. In doing so, the ASR may provide a single text interpretation of the question 302b, for example, if the ASR 304 determines that no other text interpretations are determinable from the spoken question. Alternatively, the ASR 304 may provide multiple text interpretations of the question 302b, for example, if the ASR 304 determines that more than one text interpretation is determinable from the spoken question. The ASR 304 provides all of the determined text interpretations of the spoken query to the NLP 306.

The NLP 306 is configured to determine an intent of the question 302b, and/or multiple intents of the question 302b, based on the text interpretation(s) received from the ASR 304. For example, the NLP 306 may tokenize the text interpretation(s) and determine semantic meaning(s) based on the tokens, in order to determine possible intent(s) of the text interpretation(s) of the question 302b. Based on the determined intent for each text interpretation(s), the domain classifier 308 of the NLP 306 identifies one or more information domains (e.g., from among the information domains 310a-n) that match or otherwise correspond to the determined intent.

In this regard, the server 108 may implement or otherwise access each of the information domains 310a-n. Each of the information domains 310a-n is configured to receive query/queries (e.g., the text interpretation(s) provided by the ASR 304), access respective resources (e.g., webpages) based on the query/queries, and provide one or more candidate answers to the query/queries. The data sources may differ between the information domains 310a-n. For example, respective ones of the information domains 310a-n may correspond to a local search (e.g., local time, place such as a business, weather), while other ones of the information domains 310a-n may correspond to web-based search results.

In the example of FIG. 2, the information domain 310a corresponds to web-based search results, e.g., search results that originate from and/or are derived from web-based resources. In particular, the information domain 310a may include multiple subdomains, each of which corresponds to respective web resource(s) for providing a respective candidate answer. In addition, as discussed further below with respect to FIG. 4, the information domain 310a may provide a confidence score for each of the candidate answers provided by the search subdomains 404-412. The confidences scores may, for example, be generated by each of the individual subdomains and may indicate a confidence of the respective subdomain that the candidate answer being provided is, for example, the most appropriate candidate answer for the question.

In one or more implementations, the remaining information domains 310b-310n may provide additional candidate answer(s) to supplement those provided by the information domain 310a. For example, one or more of the information domains 310b-310n may be configured to provide search results corresponding to a local search, such as local business, weather or map information (e.g., addresses). The remaining information domains 310b-310n may also provide confidence scores with their respective candidate answers.

Thus, in addition to determining intent(s) for each of the text interpretation(s), the domain classifier 308 of the NLP 306 is configured to identify which information domain(s) (e.g., from among the information domains 310a-n) match or otherwise correspond to the intent(s) determined from the text representation(s). The NLP 306 provides the respective text interpretation(s) to the identified information domain(s), which in turn provide candidate answers. The candidate answers are provided to the server re-ranker 312 in conjunction with any associated confidence scores.

The server re-ranker 312 receives the candidate answers from the information domain(s) 310a-310n that were identified by the domain classifier 308 of the NLP 306, and performs re-ranking and/or pruning of those candidate answers. As noted above, one or more of the information domains 310a-310n, such as the information domain 310a, may include multiple subdomains (e.g., search subdomains 404-412, discussed later with reference to FIG. 4), and may receive a confidence score for the candidate answer(s) from the respective search subdomains 404-412. The server re-ranker 312 may perform the re-ranking and/or pruning based on these candidate answers and their confidence score(s), and further based on any other candidate answer(s) provided by the remaining information domains 310b-310n. The server re-ranker 312 may further provide the re-ranked and/or pruned candidate answer(s) as input to the client re-ranker 316, for further determination of the response 322.

In one or more implementations, one or more confidence score conditions may be configured or pre-configured for one or more of the search subdomains 404-412 such that if the confidence score of a particular candidate answer (e.g., from one of the search subdomains 404-412) satisfies the confidence score condition for the one of the search subdomains, the particular candidate answer is ranked the highest amongst the other candidate answers (irrespective of the confidence scores of the other candidate answers) and/or one or more of the other candidate answers are discarded entirely. The confidence score condition may correspond to a predefined value representing a likelihood that the respective candidate answer is the most appropriate (or correct) answer to the question 302b. Thus, in one or more implementations, the system 300 may determine to use the respective candidate answer, having the confidence score which satisfies the confidence score condition of the corresponding search subdomain, as the response 322 to the question 302b.

In one or more implementations, none of the candidate answers may have a confidence score that satisfies the confidence score condition for a particular subdomain. Alternatively or in addition, even if a particular candidate answer has a confidence score that satisfies the confidence score condition, the system 300 in some implementations may not automatically provide that candidate answer as the response 322 to the query.

In this regard, the server re-ranker 312 may rank all candidate answers provided by the search subdomains 404-412 (e.g., via the information domain 310a), together with any additional candidate answer(s) provided by the remaining information domains 310b-310n. The server re-ranker 312 may base such ranking on one or more of: the above-mentioned confidence scores of the candidate answers as provided by one or more of the information domains 310a-n, a set of properties associated with one or more of the candidate answers, and/or server-based context data.

Regarding the set of properties, the server re-ranker 312 may be configured to request and/or receive, from one or more of the information domains 310a-n (and consequently from the search subdomains 404-412), properties corresponding to the candidate answers as provided by the information domains 310a-n. For example, each of the search subdomains 404-412 of the information domain 310a may correspond to a web resource (e.g., a webpage and/or information contained therein). Thus, an example set of properties for each candidate answer may include, but is not limited to: a network identifier (e.g., uniform resource locator, or "URL") of the respective webpage, a number of files (e.g., images, videos) associated with the webpage, a click rate associated with the webpage, and/or other properties associated with the webpage.

As noted above, the re-ranking of the candidate answers performed by the server re-ranker 312 may further be based on server-based context data. In this regard, the server context module 314 accessible by the server re-ranker 312 may be configured to obtain the server-based context data associated with the question 302b. In one or more implementations, the server-based context data provided by the server context module 314 may include topic data that broadly corresponds to the interests of a user of the electronic device 102 (e.g., that was provided to the server 108 together with the question 302b).

The topic data may indicate one or more topics associated with a user of the electronic device 102. In one or more implementations, a "topic" may encompass a particular user interest (e.g., based on user activity or user preferences stored on device), but may be more generic such that no individual user may be identifiable based on having an interest in any given topic or set of topics. For example, if a user has a specific interest in ceramics and sculpture, the topic of "art" may encompass this interest while being generic enough so as not to make the user identifiable. Thus, the topic of "art" may be included in the topic data provided to the server 108 in conjunction with the question 302b.

Moreover, in a case where a user may have explicitly opted into (e.g., via a settings user interface) sharing user information with the server 108, and/or in a case where user privacy is not a concern, the server-based context data may include one of more of user activity associated with the electronic device 102, a geolocation of the electronic device 102, and/or other information corresponding to the user of the electronic device 102, such as a user profile. As noted above, the candidate answers received from the information domain 310a may already be ranked (e.g., by virtue of having been assigned confidence scores). The server re-ranker 312 may therefore re-rank all received candidate answers based on these assigned confidence scores, together with any server-based context data corresponding to the user of the electronic device 102. In one or more implementations, the server re-ranker may implement a machine learning model to weight or bias the confidence scores based on the server-based context data and/or based on the properties corresponding to the candidate answers.

Thus, the server re-ranker 312 may rank and/or prune the candidate answers based on one or more of: confidence scores, properties (e.g., of webpages) corresponding to candidate answers, and server-based context data. The server re-ranker 312 may provide the re-ranked and/or pruned candidate answer(s) as input to the client re-ranker 316 of the electronic device 102, such as over the network 106, for further determination of the response 322 (e.g., the most appropriate answer).

In addition to receiving the candidate answer(s) from the server re-ranker 312, the client re-ranker 316 may receive candidate answer(s) from the local information domain 315. In this regard, the local information domain 315 may be configured to receive the query/queries (the text interpretation(s), e.g., as provided by the ASR 304) and to provide candidate answer(s) corresponding to local device data (e.g., application content residing on the electronic device 102). For example, this local device data may include, but is not limited to: contacts data (e.g., the contact information of favorite contacts, recent contacts), message data (e.g., the content messages from one or more messaging applications such as email or text messaging), multi-media content and/or other local content associated with applications (e.g., file content such as images, videos, documents and the like) on the electronic device 102. The local device data may be securely stored on the electronic device 102 (e.g., and when appropriate, shared with the server while preserving privacy), thereby preserving the privacy of the local device data. The local information domain 315 may also provide confidence scores with its respective candidate answer(s).

In one more implementations, the client re-ranker 316 may also receive candidate answer(s) from the respective local domains corresponding to peer devices (e.g., the electronic devices 103-104), based on peer-to-peer communication (e.g., via wireless interfaces and/or other communication interfaces) with those devices. For example, one or more of the electronic devices 103-104 may be configured to receive the query/queries (the text interpretation(s), e.g., as provided by the ASR 304) and to provide candidate answer(s) corresponding to their respective local device data (e.g., application content residing on the electronic devices 103-104). For example, this local device data may include, but is not limited to: contacts data, message data, multi-media content and/or other local content associated with applications on the respective electronic devices 103-104. The local device data may be securely stored on the respective electronic devices 103-104 (e.g., and when appropriate, shared with the server while preserving privacy), thereby preserving the privacy of the local device data. The respective local information domains for the electronic devices 103-104 may also provide confidence scores with their respective candidate answer(s).

Moreover, the client re-ranker 316 may provide for supplemental re-ranking of the candidate answer(s) received from the server re-ranker 312, the local information domain 315 and/or from the peer electronic devices 103-104, based on context data that is stored locally on the electronic device 102. For example, this device-based context data may include, but is not limited to: context data associated with contacts (e.g., who was recently contacted and when), message context (e.g., when, where and to whom messages were sent), or other context data associated with applications (e.g., user activity with timing information). The device-based context data may be securely stored on the electronic device 102 (e.g., and when appropriate, shared with the server while preserving privacy), thereby preserving the privacy of the device-based context data. For example, candidate answers that correspond or are related to recent user activity, such as reading a news article, visiting a website, etc., may be ranked higher than other candidate answers.

As noted above, in one or more implementations, if a particular candidate answer has a confidence score that meets the corresponding confidence score condition, the system 300 may automatically provide that candidate answer as the response 322 to the query. In this case, the client re-ranker 316 may not perform any re-ranking of candidate answers provided by the server re-ranker 312, and/or the server re-ranker 312 may only provide the single candidate answer, and the client re-ranker 316 may simply pass that candidate answer through as the response 322.

Thus, the client re-ranker 316 (e.g., which may access device-based context data and/or the sets of properties when provided) may work in conjunction with the server re-ranker 312 (e.g., which may access server-based context data, confidence scores and/or sets of properties), in order to select one of the candidate answers as the answer (e.g., a most appropriate answer) to the question 302b. The client re-ranker 316 outputs the selected candidate answer as the response 322. For example, the response 322 may correspond to one or more of a spoken answer (e.g., provided by a virtual assistant), a text-based answer, a media-based answer (e.g., playing a video, song, or the like), and/or a composite answer (e.g., a combination of voice, text and/or media).

In one or more implementations, the ASR 304, the NLP 306, the domain classifier 308, the information domains 310a-310n, the server re-ranker 312, the server context module 314, the client re-ranker 316, the client context module 318 and the application 320 are implemented via software instructions, stored in the memory 204 (e.g., of the respective server 108 or the electronic device 102), which when executed by the respective processor 202, cause the respective processor 202 to perform particular function(s).

In one or more implementations, one or more of the ASR 304, the NLP 306, the domain classifier 308, the information domains 310a-310n, the server re-ranker 312, the server context module 314, the client re-ranker 316, the client context module 318 and the application 320 may be implemented in software (e.g., subroutines and code), hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 4:
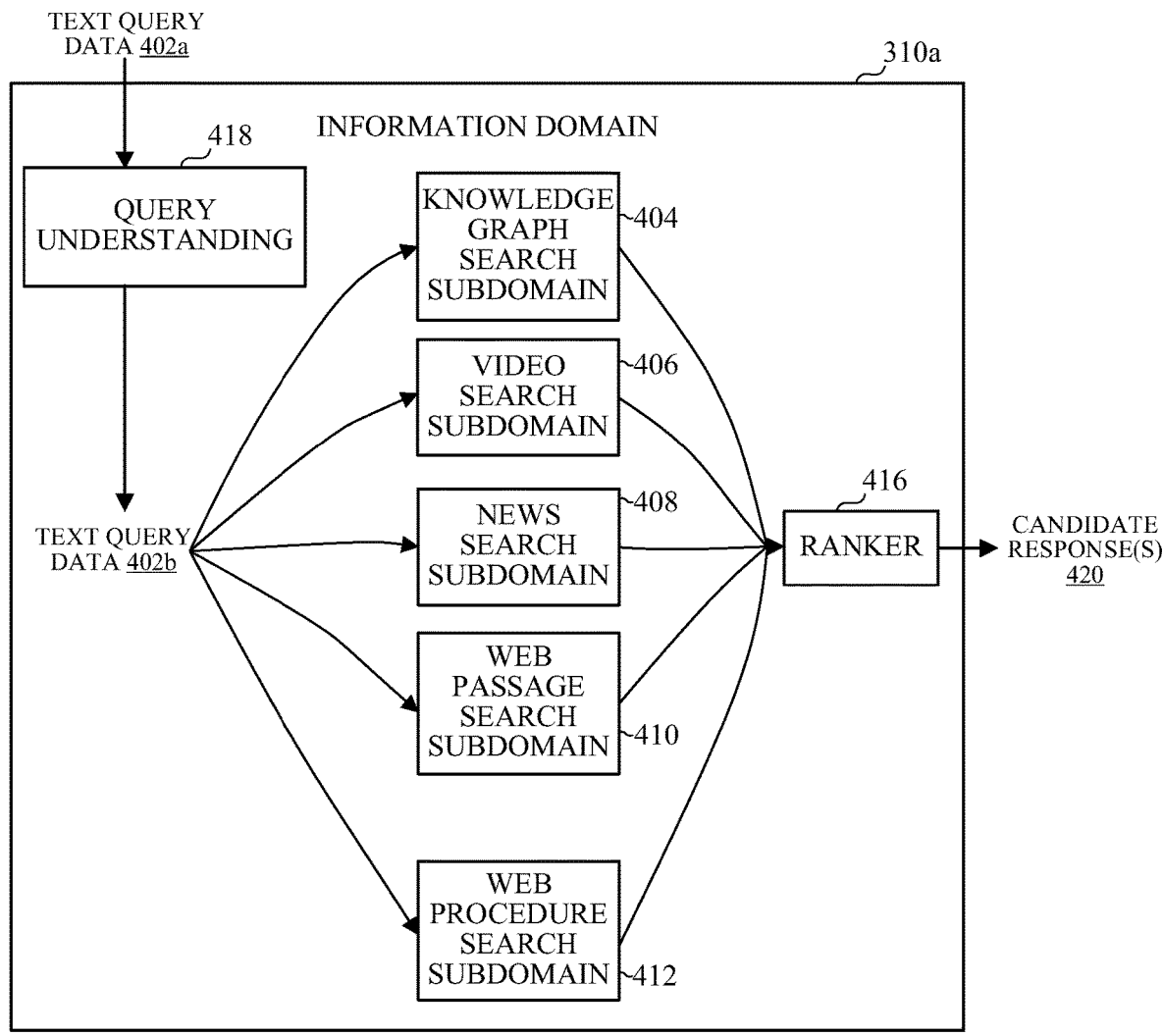
FIG. 4 illustrates an example information domain for determining an answer to a question in accordance with one or more implementations.

FIG. 4 illustrates an example information domain (e.g., the information domain 310a of FIG. 3) for determining an answer to a question in accordance with one or more implementations. For example, the information domain 310a can be implemented by one or more software modules running on the processor 202 of the server 108 and/or any other device. In another example, the information domain 310a can be implemented by one or more software modules implemented by custom hardware (e.g., one or more coprocessors). Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As shown in FIG. 4, the information domain 310a receives text query data 402a as input. In one or more implementations, the text query data 402a may be tokenized query data. The information domain includes a query understanding component 418, and the search subdomains 404-412. The search subdomains 404-412 include a knowledge graph search subdomain 404, a video search subdomain 406, a news search subdomain 408, a web passage search subdomain 410, and a web procedure search subdomain 412. However, in one or more implementations, the information domain 310a may include any number of different search subdomains. The information domain 310a further includes a ranker 416 which provides candidate responses 420 with respective confidence scores, for ranking/output of the candidate response(s) 420, As noted above, the domain classifier 308 of the NLP 306 may have identified the information domain 310a as matching or otherwise corresponding to the intent of the text interpretation(s), as determined by the ASR 304, of the question 302b. Thus, the NLP 306 may query the information domain with the text query data 402a, which may correspond to the text interpretation(s), or which may be formatted as token(s) of the text interpretation(s) by the NLP 306.

In one or more implementations, the query understanding component 418 may perform additional query interpretation of the text query data 402a. For example, the query understanding component 418 may include its respective natural language processing logic, domain classification logic, and the like. Based on this additional logic, the query understanding component 418 may modify the text query data 402a, may not modify the text query data 402a, or may determine that the information domain 310a cannot provide a relevant answer in response to the text query data 402a. The output from the query understanding module is represented as text query data 402b (e.g., in a case where an answer can be provided), and text query data 402b which may be the same or different than the text query data 402a.

Each of the search subdomains 404-412 may correspond to a web-based information domain that is configured to provide a respective candidate answer in response to the text query data 402b, when possible. Moreover, each of the search subdomains 404-412 may provide its respective candidate answer in a format that differs from those provided by the other search subdomains 404-412.

In this regard, knowledge graph search subdomain 404 may be configured to retrieve information from one or more knowledge-based websites or resources, such as an online dictionary or encyclopedia (e.g., Wikipedia). For example, in response to the question 302b of "who is the president of the United States?," the knowledge graph search subdomain 404 may query one or more knowledge-based websites (e.g., online encyclopedias) based on the text query data 402b corresponding to the question 302b. Alternatively or in addition, the knowledge graph search subdomain 404 may access a database containing information that was obtained (e.g., scraped) from one or more knowledge-based websites. The knowledge graph search subdomain 404 may therefore obtain corresponding search result(s), rank those results, and determine a candidate answer to the question 302b. If multiple text interpretations of the question 302b were determined by the ASR 304, the knowledge graph search subdomain 404 may determine a separate candidate answer for each text interpretation for which a candidate answer is determinable.

The video search subdomain 406 may be configured to retrieve information from one or more video-sharing websites or resources. For example, in response to the question 302b of "how do I change a tire?," the video search subdomain 406 may query one or more video websites (or other video resources) based on the text query data 402b corresponding to the question 302b. In response, the video search subdomain 406 may receive corresponding search result(s), rank those results, and determine a candidate answer (or multiple answers for multiple text interpretations) to the question 302b.

The news search subdomain 408 may be configured to retrieve information from one or more news-based websites or resources. For example, in response to the question 302b of "who is the president of the United States?," the news search subdomain 408 may query one or more news-based websites based on the text query data 402b corresponding to the question 302b. In response, the news search subdomain 408 may receive corresponding search result(s), rank those results, and determine a candidate answer (or multiple answers for multiple text interpretation(s)) to the question 302b.

The web passage search subdomain 410 may be configured to provide passage-based answers to questions, for example, as retrieved from one or more websites or resources that provide answers in a passage-based format (e.g., question and answer forums, online dictionaries, and the like). In one or more implementations, the web passage search subdomain 410 may differ from the knowledge graph search subdomain 404, in that the knowledge graph search subdomain 404 is configured to provide fact-based answers to objective questions (e.g., factual answers to questions), while the web passage search subdomain 410 is configured to provide answers to subjective and/or objective questions. For example, in response to the question 302b of "is car insurance worth it?," the web passage search subdomain 410 may query a first website configured to provide subjective/objective responses (e.g., a question and answer forum) and a second website configured to provide only objective responses (e.g., an online encyclopedia entry for car insurance). In response, the web passage search subdomain 410 may receive corresponding search result(s), rank those results, and determine a candidate answer (or multiple answers for multiple text interpretation(s)) to the question 302b.

The web procedure search subdomain 412 may be configured to provide procedure-based answers to questions, for example, as retrieved from one or more websites or resources that provide answers in a procedure-based format (e.g., instructional websites, question and answer forums). An example of a procedure-based format is a series of step-by-step instructions describing how to perform a procedure. For example, in response to the question 302b of "how do I change a tire?," the web procedure search subdomain 412 may query one or more procedure-based websites based on the text query data 402b corresponding to the question 302b. In response, the web procedure search subdomain 412 may receive corresponding search result(s), rank those results, and determine a candidate answer (or multiple answers for multiple text interpretation(s)) to the question 302b.

Although the information domain 310a is illustrated and described with respect to the search subdomains 404-412, the information domain 310a may be configured to include fewer or more subdomains. For example, while not illustrated in FIG. 4, the information domain 310a may be configured to include one or more subdomains for scheduling travel (e.g., transportation such as flights, lodging such as hotels), by retrieving travel information from one or more travel websites or resources.

The ranker 416 receives the candidate answer(s) from each of the search subdomains 404-412, and may provide (or receive) a confidence score (e.g., and/or a set of features) for each candidate answer. In one or more implementations, the ranker 416 may rank the candidate answer(s) from each of the search subdomains based on one of more of: a set of properties associated with each candidate answer, and/or server-based context data.

As noted above, the set of properties for each subdomain may correspond to the websites and/or resources associated with the respective candidate answer (e.g., URL, number of files, click rate, and the like). In addition, the server-based context data may include topic data (e.g., that relates to the user in a general, non-identifiable manner), or additional data that the user may have explicitly opted into providing (e.g., geolocation, user activity, user profile, etc.). The ranker 416 may assign respective confidences scores for the candidate answers, or otherwise rank/prune the candidate answers, based on the server-based context data. The ranker 416 may provide the ranked candidate answer(s) and respective confidence scores as input to the server re-ranker 312 of the server 108.

As noted above, the ranker 416 may determine that a candidate answer provided by one of the search subdomains 404-412 is likely to be the appropriate (or correct) answer to the question 302b. In response, the ranker 416 may assign a confidence score to that candidate answer. This confidence score may have an impact in additional evaluation and ranking. For example, if the ranker 416 assigns a confidence score that meets (or exceeds) the above-described threshold confidence score, this confidence score may be a signal to the system 300 to use the respective candidate answer and bypass additional evaluation of other candidate answers.

Upon receiving the candidate answers and respective confidence scores, the server re-ranker 312 may perform re-ranking as discussed above with respect to FIG. 3. Thus, the system 300, including the information domain 310a, may be used to determine a response 322 to a question 302b.

In one or more implementations, the system 300, including the information domain 310a, may generate, employ, tune, and/or train a machine learning model based on user feedback to candidate answers. For example, human graders and/or feedback in the form of task completion metrics may be used to train the machine learning model. Training parameters for the machine learning model may include, but are not limited to: whether the user interacted with the response (e.g., by clicking on a link, reading a passage, clicking through steps of a procedural-based answer), the amount of time the user interacted with the response (e.g., the amount of time spent watching a video, or listening to an audio file), and whether the user completed consumption of the response content (e.g., whether the user completed watching a video or listening to an audio file).

In one or more implementations, the information domain 310a, the knowledge graph search subdomain 404, the video search subdomain 406, the news search subdomain 408, the webpage search subdomain 410, the web procedure search subdomain 412 and the ranker 416 are implemented via software instructions, stored in the memory 204 (e.g., of the server 108), which when executed by the processor 202, cause the processor 202 to perform particular function(s).

In one or more implementations, one or more of the information domain 310a, the knowledge graph search subdomain 404, the video search subdomain 406, the news search subdomain 408, the webpage search subdomain 410, the web procedure search subdomain 412 and the ranker 416 may be implemented in software (e.g., subroutines and code), hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 5:
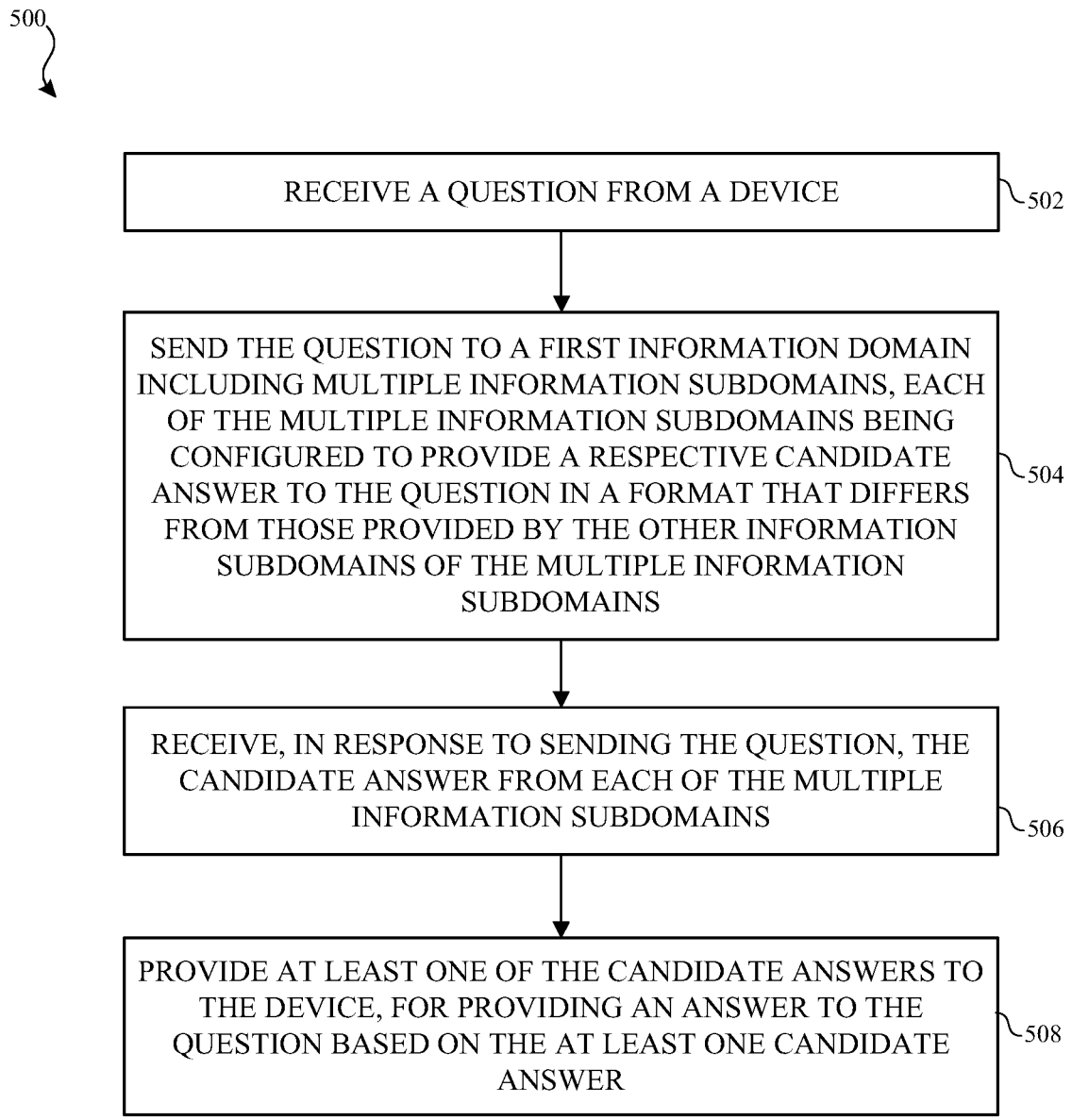
FIG. 5 illustrates a flow diagram of an example process for determining an answer to a question in accordance with one or more implementations.

FIG. 5 illustrates a flow diagram of an example process for determining an answer to a question in accordance with one or more implementations. For explanatory purposes, the process 500 is primarily described herein with reference to the server 108 and the electronic device 102 of FIG. 1. However, the process 500 is not limited to the server 108 and the electronic device 102 of FIG. 1, and one or more blocks (or operations) of the process 500 may be performed by one or more other components of the server 108 and the electronic device 102, and/or by other suitable devices (e.g., the electronic devices 103-104). Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

The server 108 receives a question from the electronic device 102 (502). For example, the question may be a text interpretation of a spoken question provided by a user of the electronic device 102. The server 108 sends the question to a first information domain, such as the information domain 310a (504). For example, the server 108 may send the question to the first information domain when the server determines that an intent of the question corresponds to the first information domain. The first information domain may include multiple search subdomains (e.g., any of search subdomains 404-412), each of the multiple search subdomains being configured to provide a respective candidate answer to the question in a format that differs from those provided by the other search subdomains of the multiple search subdomains.

The server 108 receives, in response to sending the question, the candidate answer from each of the multiple search subdomains (506). The server 108 provides at least one of the candidate answers to the electronic device 102, for providing an answer to the question based on the at least one candidate answer (508).

The server 108 may send the question to a second information domain (e.g., any of information domains 310b-310n), which is configured to provide an additional candidate answer to the question. For example, the server 108 may determine that an intent of the question corresponds to the second information domain in addition to the first information domain. The server 108 may provide the additional candidate answer together with the at least one candidate answer to the electronic device 102, for providing the answer to the question based on the additional candidate answer and the at least one candidate answer.

The server 108 may receive a respective confidence score for each of the candidate answers, and may provide the respective confidence score for the at least one of the candidate answer to the electronic device 102, for providing the answer to the question based on the respective confidence and the at least one candidate answer. The respective confidence scores may be adjusted (e.g., biased) based on server-based context data. For example, the server-based context data may correspond to topic data associated with a user of the device.

In one or more implementations, the electronic device 102 may be configured to provide the answer to the question based on device-based context data. For example, the device-based context data may be stored locally on the device, and may correspond to at least one of context related to contact, messages, or user activity associated with device applications, e.g. device application usage data. In addition, the electronic device 102 may be configured to provide the answer as a composite answer based on at least two of the candidate answers.

Figure 6:
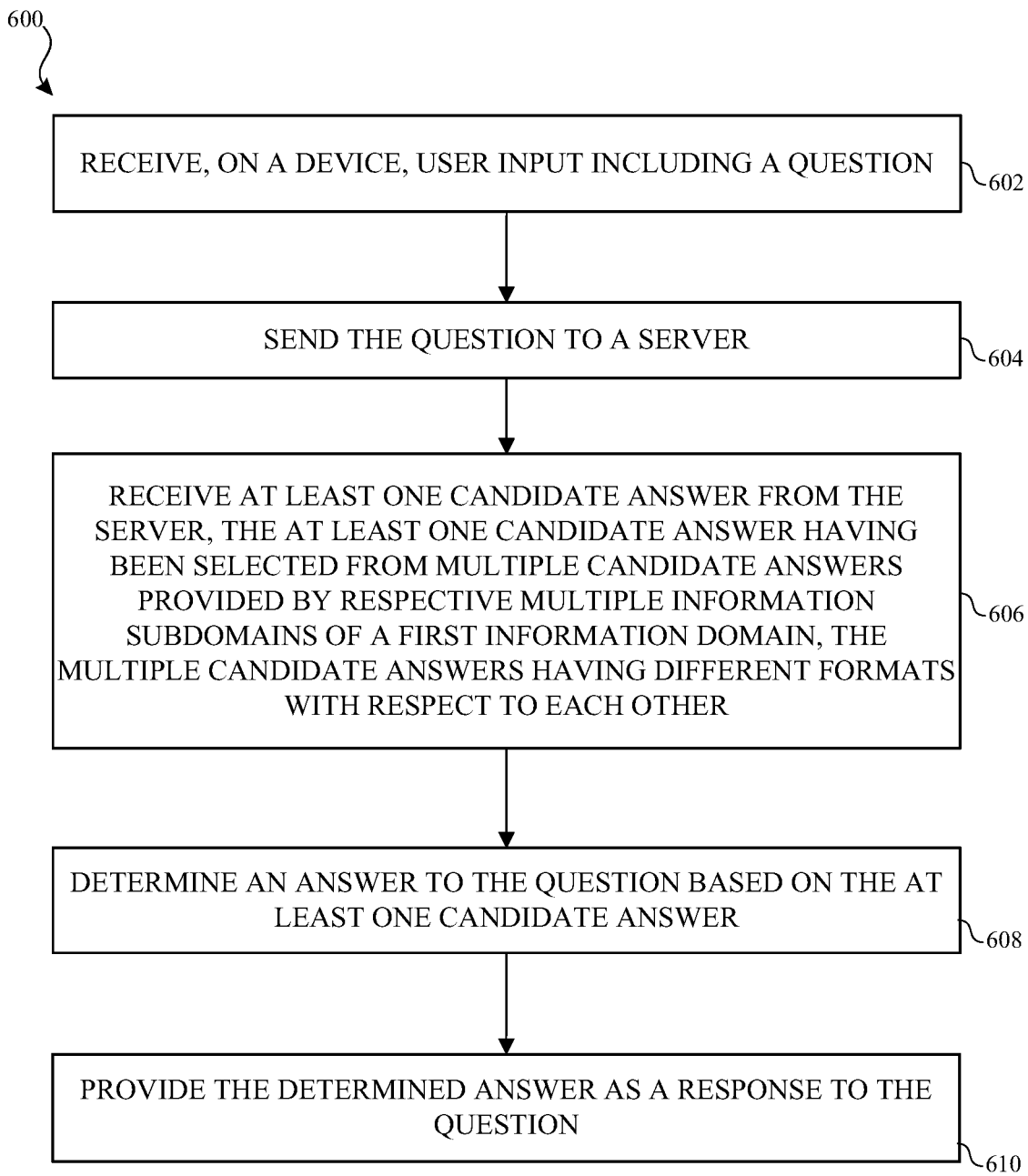
FIG. 6 illustrates a flow diagram of an example process for determining an answer to a question in accordance with one or more implementations.

FIG. 6 illustrates a flow diagram of an example process for determining an answer to a question in accordance with one or more implementations. For explanatory purposes, the process 600 is primarily described herein with reference to the electronic device 102 and the server 108 of FIG. 1. However, the process 600 is not limited to the electronic device 102 and the server 108 of FIG. 1, and one or more blocks (or operations) of the process 600 may be performed by one or more other components of the electronic device 102 and the server 108, and/or by other suitable devices (e.g., the electronic devices 103-104). Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

The electronic device 102 receives user input including a question (602). The electronic device 102 sends the question to the server 108 (604). The electronic device 102 receives at least one candidate answer from the server 108 (606), the at least one candidate answer having been selected from multiple candidate answers provided by respective multiple search subdomains (e.g., any of search subdomains 404-412) of a first information domain (e.g. the information domain 310a). The multiple candidate answers may have different formats with respect to each other.

The electronic device 102 determines an answer to the question based on the at least one candidate answer (608). The electronic device 102 may receive an additional candidate answer from the server 108, the additional candidate answer having been provided by a second information domain, and may determine the answer to the question based on the additional candidate answer in conjunction with the at least one candidate answer.

The electronic device 102 may receive a confidence score for the at least one candidate answer, and may further determine the answer to the question based on the confidence score for the at least one candidate answer. The confidence score may be adjusted (e.g., biased) based on server-based context data. For example, the server-based context data may correspond to topic data associated with a user of the device.

Determining the answer may be further based on device-based context data. For example, the device-based context data may be stored locally on the device, and may correspond to at least one of context related to contacts, messages, or user activity associated with device applications. In addition, determining the answer may include generating a composite answer from at least two candidate answers received from the server. The electronic device 102 then provides the determined answer as a response to the question (610).

As described above, one aspect of the present technology is the gathering and use of data available from various sources to, for example, improve the delivery to users of content that may be of interest to them, such as providing answers to users' questions. The present disclosure contemplates that in some instances, this gathered data may include personal information data that identifies user activity on an electronic device with respect to a specific person. Such personal information data can include, for example, identification of user interests, demographic data, temporal-based data, location-based data, or other identifying information.

The present disclosure recognizes that the use of such personal information data, in the present technology, can be used to the benefit of users. For example, the personal information data can be used to deliver targeted content that is of greater interest to the user (e.g., providing the user with relevant search results or query suggestions, providing the user with answers to questions that are likely semantically relevant, and the like). Accordingly, use of such personal information data enables discrete control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. As is described herein, the collected personal information is only stored on the user's own devices, with the exception of temporarily caching some data on a server for transport purposes.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, users can select not to provide temporal or location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information, or publically available information.

Figure 7:
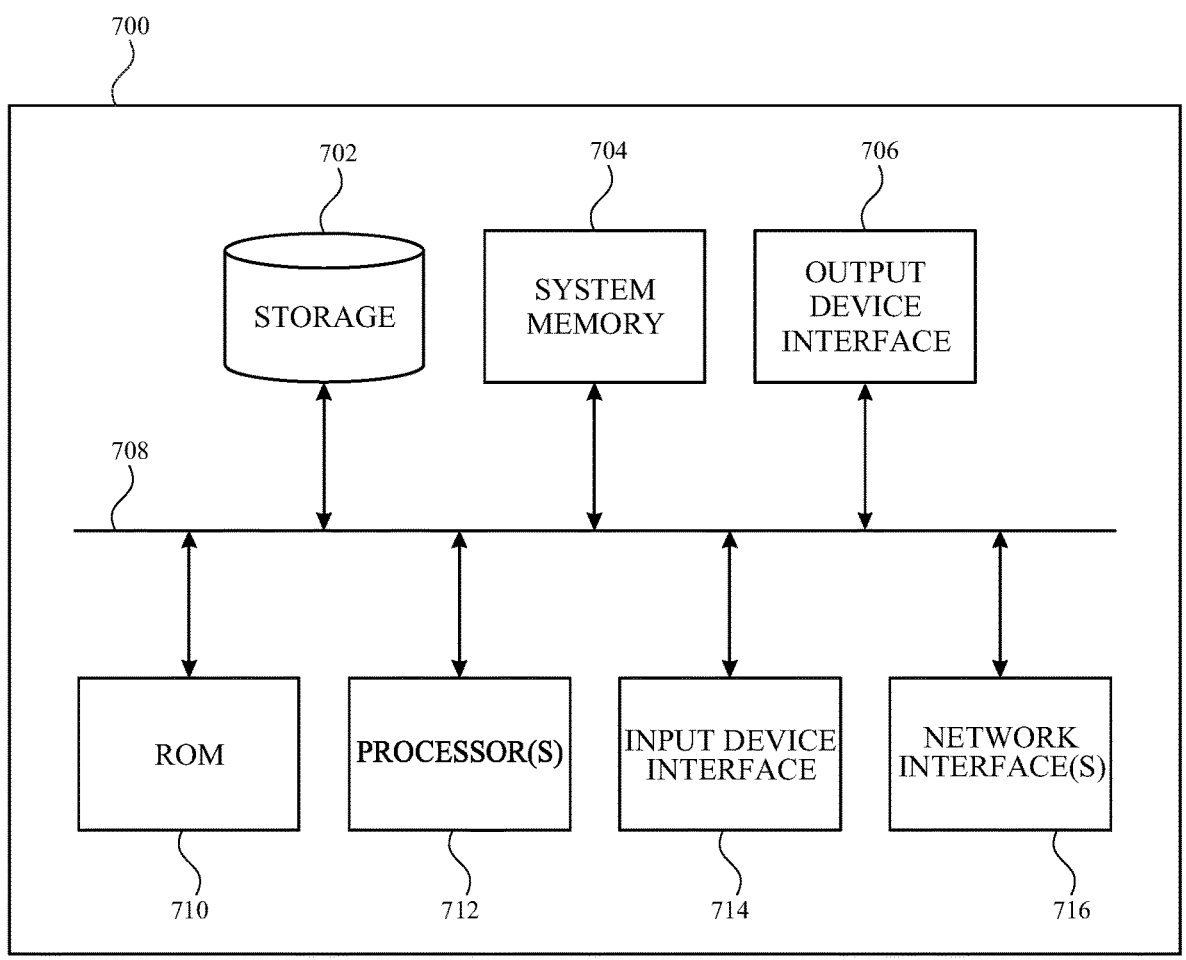
FIG. 7 illustrates an example electronic system with which aspects of the subject technology may be implemented in accordance with one or more implementations.

FIG. 7 illustrates an electronic system 700 with which one or more implementations of the subject technology may be implemented. The electronic system 700 can be, and/or can be a part of, one or more of the electronic devices 102-104, and/or one or the server 108 shown in FIG. 1. The electronic system 700 may include various types of computer readable media and interfaces for various other types of computer readable media. The electronic system 700 includes a bus 708, one or more processing unit(s) 712, a system memory 704 (and/or buffer), a ROM 710, a permanent storage device 702, an input device interface 714, an output device interface 706, and one or more network interfaces 716, or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the permanent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are needed by the one or more processing unit(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processing unit(s) 712 may need at runtime. In one or more implementations, the processes of the subject disclosure are stored in the system memory 704, the permanent storage device 702, and/or the ROM 710. From these various memory units, the one or more processing unit(s) 712 retrieves instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, the bus 708 also couples the electronic system 700 to one or more networks and/or to one or more network nodes, such as the server 108 shown in FIG. 1, through the one or more network interface(s) 716. In this manner, the electronic system 700 can be a part of a network of computers (such as a LAN, a wide area network ("WAN"), or an Intranet, or a network of networks, such as the Internet. Any or all components of the electronic system 700 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device, comprising:
    at least one processor; and
    a memory including instructions that, when executed by the at least one processor, cause the at least one processor to:
       receive a representation of a spoken question from a client device, the spoken question having been received via a virtual assistant at the client device;
       determine, based at least in part on the representation of the spoken question, at least one intent of the spoken question;
       select a first information domain of a plurality of information domains that corresponds to the determined at least one intent;
       send the representation of the spoken question to the selected first information domain comprising plural search subdomains, each of the plural search subdomains being configured to provide a respective candidate answer to the spoken question in a format that differs from those provided by the other search subdomains of the plural search subdomains;
       receive, in response to sending the representation of the spoken question, the respective candidate answer and a corresponding respective confidence score from each respective search subdomain of the plural search subdomains, wherein the corresponding respective confidence score indicates a likelihood, determined by the respective search subdomain, of a correctness of the respective candidate answer with regard to the spoken question; and
       provide at least one of the candidate answers to the client device, for providing an answer to the spoken question based on the at least one of the candidate answers.

2. The device of claim 1, wherein the instructions further cause the at least one processor to:
    provide the respective confidence score for the at least one of the candidate answers to the client device, for providing the answer to the question based on the respective confidence and the at least one of the candidate answers.

3. The device of claim 2, wherein the instructions further cause the at least one processor to adjust the respective confidence scores based on server-based context data.

4. The device of claim 3, wherein the server-based context data corresponds to topic data associated with a user of the device.

5. The device of claim 4, wherein the device is configured to provide the answer to the question based on device-based context data.

6. The device of claim 5, wherein the device-based context data is stored locally on the device, and corresponds to at least one of context related to contacts, messages, or user activity associated with device applications.

7. The device of claim 2, wherein the instructions further cause the at least one processor to rank the candidate answers based on the respective confidence scores.

8. The device of claim 1, wherein the device is configured to provide the answer as a composite answer based on at least two of the candidate answers.

9. The device of claim 1, wherein the instructions further cause the at least one processor to:

send the question to a second information domain configured to provide an additional candidate answer to the question; and provide the additional candidate answer together with the at least one of the candidate answers to the device, for providing the answer to the question based on the additional candidate answer and the at least one of the candidate answers.

10. A non-transitory computer-readable storage medium comprising instructions that, when executed by one or more processors, cause the one or more processors to perform operations comprising:

receiving, on a device, user input comprising a spoken question via a virtual assistant at the device;

sending the question to a server;

receiving on the device, a plurality of candidate answers from the server, the plurality of candidate answers having been selected from candidate answers provided by respective plural search subdomains of a first information domain, the plurality of candidate answers having different formats with respect to each other, and the plurality of candidate answers having being ranked at the server based on server-based context data corresponding to a user of the device, the user being unidentifiable from the server-based context data;

re-ranking, on the device, the plurality of candidate answers based at least in part on device-based context data corresponding to the user, the device-based context data being unavailable to the server;

determining, on the device, an answer to the question based on the re-ranked plurality of candidate answers; and providing the determined answer as a response to the question via the virtual assistant at the device.

11. The non-transitory computer-readable storage medium of claim 10, wherein the operations further comprise:

receiving a confidence score for the at least one candidate answer, wherein the answer to the question is further determined, on the device, based on the confidence score for the at least one candidate answer.

12. The non-transitory computer-readable storage medium of claim 11, wherein the operations further comprise adjusting, on the device, the confidence score for the at least one candidate answer based on server-based context data.

13. The non-transitory computer-readable storage medium claim 12, wherein the server-based context data corresponds to topic data associated with a user of the device.

14. The non-transitory computer-readable storage medium of claim 13, wherein the determining, on the device, the answer to the question further comprises determining, on the device, the answer to the question based on the at least one candidate answer and device-based context data.

15. The non-transitory computer-readable storage medium of claim 14, wherein the device-based context data is stored locally on the device, and corresponds to at least one of context related to contacts, messages, or user activity associated with device applications.

16. The non-transitory computer-readable storage medium of claim 10, wherein the determining, on the device, the answer to the question further comprises:

generating, on the device, a composite answer from at least two candidate answers received from the server.

17. The non-transitory computer-readable storage medium of claim 10, wherein the operations further comprise:

receiving an additional candidate answer from the server, the additional candidate answer having been provided by a second information domain; and determining, on the device, the answer to the question based on the additional candidate answer and the at least one candidate answer.

18. A method, comprising:

receiving a representation of a question from a device;

determining, based at least in part on the representation of the question, at least one intent of the question;

selecting a first information domain of a plurality of information domains that corresponds to the determined at least one intent;

sending the representation of the question to the selected first information domain comprising plural search subdomains, each of the plural search subdomains being configured to provide a respective candidate answer to the question in a format that differs from those provided by the other search subdomains of the plural search subdomains;

receiving, in response to sending the representation of the question, the candidate answer from each of the plural search subdomains, and a respective confidence score for each of the candidate answers; and providing at least one of the candidate answers and the respective confidence score to the device, for providing an answer to the question based on the respective confidence score and the at least one of the candidate answers.

19. The method of claim 18, further comprising adjusting the respective confidence scores based on server-based context data.

20. The method of claim 19, wherein the server-based context data corresponds to at least one of general user activity associated with the device, a geolocation of the device, or topic data associated with a user of the device.

* * * * *